United States Patent
Thieleke et al.

(10) Patent No.: US 6,505,767 B2
(45) Date of Patent: Jan. 14, 2003

(54) COMBUSTION-ENGINED TOOL HAVING A BRAKING DEVICE FOR ITS PISTON

(75) Inventors: Joachim Thieleke, Wasserburg (DE); Kaveh Towfighi, Sigmarszell (DE); Iwan Wolf, Chur (CH)

(73) Assignee: Hiltie Aktiengeselschaft, Schaan (LI)

( * ) Notice: Subject to any disclaimer, the term of this patent is extended or adjusted under 35 U.S.C. 154(b) by 27 days.

(21) Appl. No.: 09/741,288

(22) Filed: Dec. 19, 2000

(65) Prior Publication Data

US 2001/0011535 A1 Aug. 9, 2001

(30) Foreign Application Priority Data

Dec. 23, 1999 (DE) .......................................... 199 62 696

(51) Int. Cl.⁷ ................................................ B25C 1/08
(52) U.S. Cl. ........................................ 227/10; 227/130
(58) Field of Search ................................ 227/10, 9, 11, 227/8, 129, 130; 173/53, 10; 92/18, 19, 23

(56) References Cited

U.S. PATENT DOCUMENTS

| | | | |
|---|---|---|---|
| 5,538,172 A | * | 7/1996 | Jochum et al. ............... 227/10 |
| 5,671,880 A | * | 9/1997 | Ronconi ...................... 227/130 |
| 5,860,580 A | * | 1/1999 | Velan et al. ................... 227/10 |
| 5,881,940 A | * | 3/1999 | Almeras et al. ............... 227/10 |
| 5,897,043 A | * | 4/1999 | Veoukas et al. ............... 227/10 |
| 5,909,836 A | * | 6/1999 | Shkolnikov et al. .......... 227/10 |

* cited by examiner

*Primary Examiner*—Scott A. Smith
*Assistant Examiner*—Brian D Nash
(74) *Attorney, Agent, or Firm*—Sidley Austin Brown & Wood, LLP

(57) ABSTRACT

A portable, internal combustion-engined tool includes a combustion chamber (1), a piston (8) adjoining the combustion chamber (1), with a pressure build-up in the combustion chamber (1) providing for movement of the piston (8) from its initial position, in which the piston adjoins the combustion chamber (1), away from the combustion chamber (1). A brake device (43) retains the piston (8) substantially in its initial position during build-up of pressure in the combustion chamber (1), with a braking force applied to piston (8) being changeable for adjusting the amount of energy generated in the combustion chamber and transmittable to the piston (8).

9 Claims, 2 Drawing Sheets

COMBUSTION-ENGINED TOOL HAVING A BRAKING DEVICE FOR ITS PISTON

BACKGROUND OF THE INVENTION

1. Field of the Invention

The present invention relates to a portable, combustion-engined tool, in particular, a setting tool for driving in fastening elements.

2. Description of the Prior Art

A tool of a type discussed above is disclosed in European Publication EP 0 818 281A2. The known tool includes a combustion chamber, a piston adjoining the combustion chamber, a pressure build-up in the combustion chamber providing for movement of the piston from its initial position, in which it adjoins the combustion chamber, away from the combustion chamber, and means for retaining the piston substantially in its initial position during build-up of pressure in the combustion chamber.

The device for retaining the piston is usually used to insure that the piston would not be displaced from its initial position at its upper dead point in the period between two setting processes and to retain the piston with a predetermined retaining force until a relatively high pressure is built-up in the combustion chamber. The retaining device should provide a high power yield to prevent the displacement of the piston already at the beginning of the pressure build-up, which leads to reduction of the flame front speed which, in turn, leads to transmission only of a small portion of the energy to the piston.

Accordingly, an object of the present invention is to provide in a tool of the type described above means for adjusting the amount of energy which is generated in the combustion chamber and is transmitted to the piston.

SUMMARY OF THE INVENTION

This and other objects of the present invention, which will become apparent hereinafter, are achieve by changing the braking force applied to the piston. By adjusting the braking force, the force, which retains the piston in its initial position, can be adjusted within certain limits which, in turn, influence the amount of energy consumed by the piston. By appropriate constructive measures, the braking force acting on the piston can be so selected that maximum of the generated energy is transmitted to the piston. Thereby a better effectiveness of the tool is achieved.

Generally, the braking device can act on different portion of the piston, e.g., it can act on the piston plate or the piston rod. The braking effect can be achieved with different means: electromagnetic, pneumatic, hydraulic, mechanical, and the like. Further, the braking force applied by the braking device can also vary dependent on the position of the piston. After the force retaining the piston in its initial position, which is predetermined by the braking force, has been overcome, with the piston moving away from its initial position, the braking force, upon further displacement of the piston in the operating direction, can be increased or changed in any other desirable way. Upon return of the piston to its initial position the braking force can, e.g., be minimized or be removed altogether to provide for a complete return of the piston to its initial position.

According to one preferred embodiment of the present invention, the braking device is provided in the region of the piston rod, which only slightly increases the dimensions of the entire structure so that a compact tool is obtained. The braking device can have only one braking member biased against the piston rod under an action of a compression spring which, according to further development of the invention, can be formed as a circular spring surrounding the piston rod. When the biasing spring is formed as a circular spring, a plurality of braking members can be arranged between the piston rod and the spring which produces a better braking effect. As a braking member, a roll member, a ball, a cylinder, and the like can be used. Such a roll member is held by a circular spring in a cage-like manner and rolls with respect to the piston rod when the piston rod moves through the braking device. The use of roll members permits to obtain a braking device with minimum wear.

In accordance with a further embodiment of the braking device according to the present invention, there is provided an actuation member having an adjustable actuation force and acting on the spring. By actuating the actuation member, the braking force acting on the piston can be change in a simple manner.

When the braking member biasing spring is formed as a circular spring, the actuation member can be formed as a spring stirrup having two legs between which the circular spring, together with the piston rod is received. Dependent on movement of the stirrup base toward or away from the piston rod, the legs would expand to a greater or lesser degree, applying, respectively, a smaller or greater force to the spring which, in turn, applies a smaller or greater biasing force to the braking member. The displacement of the stirrup base changes, thus, the braking force applied by the braking member to the piston rod.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
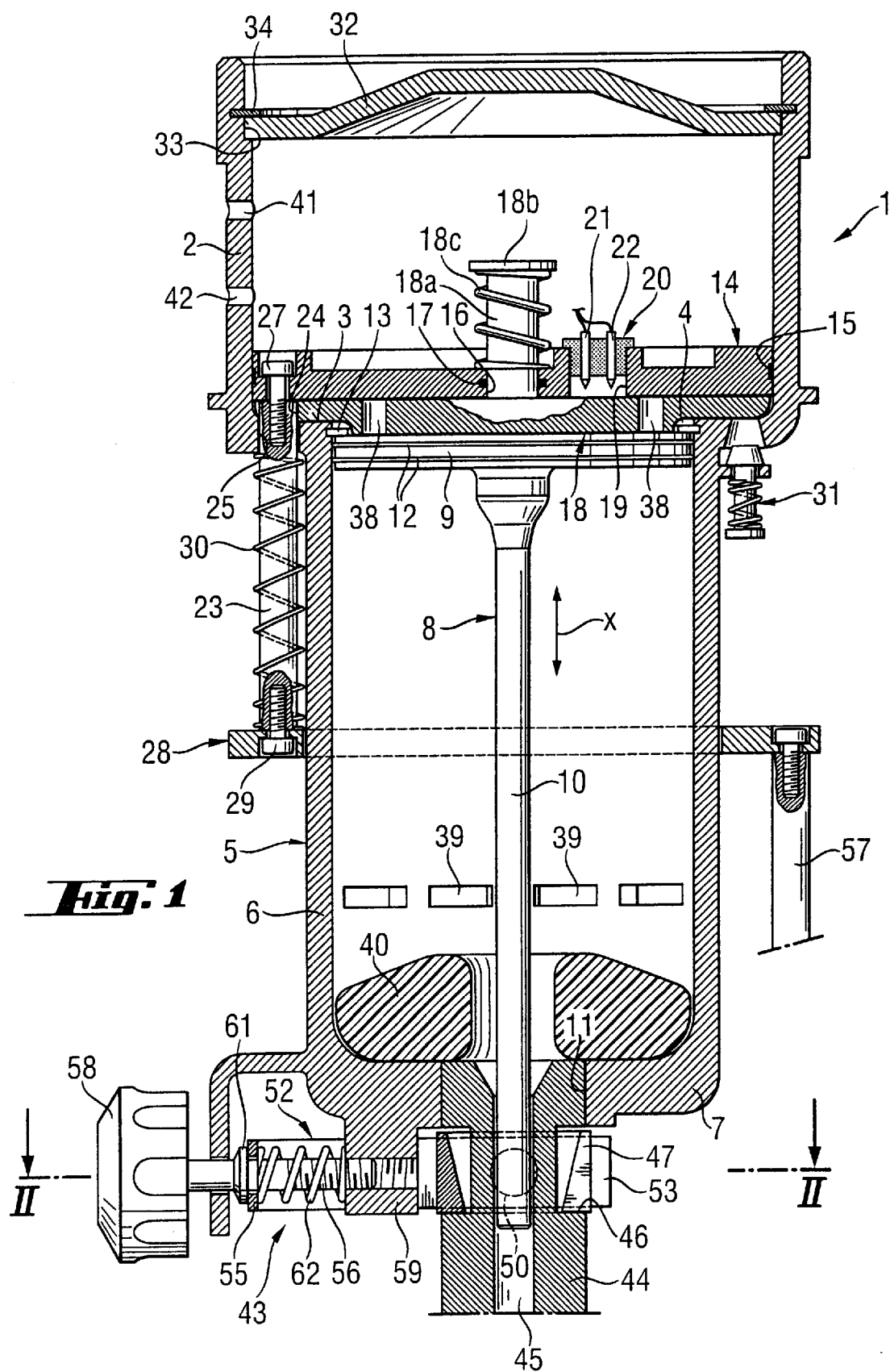
FIG. 1 shows an axial cross-sectional view of a combustion-engined tool according to the present invention in the region of the tool combustion chamber.

A combustion chamber 1 of an inventive combustion-engined tool, in particular, of a setting tool, which is shown in FIG. 1, has a cylindrical shape and includes a cylindrical wall 2 and a ring-shaped bottom 3 adjoining the cylindrical wall 2. In the center of the bottom 3, there is provided an opening 4. A guide cylinder 5, which has a cylindrical wall 6 and a bottom 7, adjoins the opening 4 in the bottom 3 of the combustion chamber 1. A piston 8 is slidably displaceably arranged in the guide cylinder 5 for displacement in the longitudinal direction X of the guide cylinder 5. The piston 8 consists of a piston plate 9 facing the combustion chamber 1 and a piston rod 10 extending from the center of the piston plate 9. The piston rod 10 projects through an opening 11 formed in the bottom 7 of the guide cylinder 5.

FIG. 1 shows a non-operational position of the setting tool in which the piston 8 is in its rearward off-position. The side of the piston plate 9 adjacent to the bottom 3 of the combustion chamber 1 is located closely adjacent to the bottom 3, with the piston rod 10 projecting only slightly beyond the bottom 7 of the guide cylinder 5.

Sealing rings 12 are provided on opposite sides of the piston plate 9 to seal the chambers on the opposite sides of the piston plate 9 from each other. For fixing the piston 8 in its rearward off-position, there is provided a stop 13.

Inside of the combustion chamber 1, there is provided a cylindrical plate 14 further to be called a movable combustion chamber wall or movable wall. The plane of the plate 14 extends transverse to the longitudinal direction of the tool. The movable wall 14 is displaceable in the longitudinal direction X of the combustion chamber 1. For separating the chambers on opposite sides of the movable wall 14, an annular sealing 15 is provided on the circumference of the movable wall 14. The movable wall 14 has a central opening 16, with an annular sealing 17 provided in the wall of the opening 16. Sidewise of the central opening 16 at a distance therefrom, there is provided a through-opening 19. An ignition device 20 is sealingly mounted in the opening 19. The ignition device 20 has two electrodes 21, 22 forming an electrical path for generating an ignition spark. The electrodes 21–22 face in a direction toward the bottom 3 of the combustion chamber 1.

A separation plate 18 is provided between the bottom 3 of the combustion chamber 1 and the movable wall 14. The separation plate 18 likewise as a circular shape and ahs an outer diameter corresponding to the inner diameter of the combustion chamber 1. The separation plate 18 has a plurality of axial through-opening 38 spaced from the center of the separation plate 18. The separation plate 18 is fixedly connected with a central projection 18a that extends into the though-opening 16 of the movable wall 14. At the free end of the central projection 18a, there is provided a ring-shaped circumferential flange 18b which is engaged by the movable wall 14 when it is displaced in the axial direction. A spring 18c, which is provided between the flange 18b and the opposite rear side of the movable wall 14 and is supported on the projection 18a, always biased the separation plate 18 toward the movable wall 14 by applying a biasing force to the flange 18b.

For displacing the movable wall 14, there are provided several, e.g., three drive rods 23 uniformly distributed along the circumference of the movable wall 14 and fixedly connected therewith. Only one of the drive rods 23 is shown in FIG. 1. The drive rods 23 extend parallel to the axis of the combustion chamber 1 and outside of cylindrical wall 6 of the guide cylinder 5. The drive rods 23 extend through openings 24, respectively, formed in the separation plate 18 and through corresponding openings 25 is provided win a circumferential seal located in the surface defining the opening 25 for sealing the combustion chamber 1 from outside. The movable wall 14 is connected with drive rods 23 by, e.g., screws 27 which extend through the movable wall 14 and are screwed into the drive rods 23. The free ends of the drive rods 23 are connected with each other by a drive ring 28 which is arranged concentrically with the combustion chamber axis and which circumscribes the guide cylinder 5. The drive ring 28 is connected with the drive rods 23 by screws which extend through the drive ring and are screwed into the drive rods 23 through end surfaces of the free ends of respective drive rods 23. Each of the drive rods 23 supports a compression spring 30 extending between the bottom 3 of the combustion chamber 1 and the drive ring 28. The compression spring 30 are designed for pulling the movable wall 14 toward the bottom 3. The displacement of the movable wall 14 in a direction away from the bottom 3 is limited by a stop shackle 32 which is formed as a plate-shaped member. The shackle 32 is mounted in a circumferential groove 33 formed in the upper portion of the combustion chamber 1. The shackle 32 is secured in the groove 33 with a locking ring 34. The shackle 32 has an upwardly bulging section which serves as a stop for the central projection 18a of the separation plate 18.

At least one aeration/deaeration valve 31 is provided in the bottom 3 of the combustion chamber 1. For the sake of clarity of the entire structure, the valve 31 is shown only schematically. The aeration/deaeration valve 31 serves for admitting fresh air into the combustion chamber 1 and for removal of waste gases from the combustion chamber 1, as it will be described in more detail further below. In the condition of the combustion chamber 1 shown in FIG. 1, the aeration/deaeration valve 31 is open. The condition of the combustion chamber 1 shown in FIG. 1 corresponds to the off-condition of the tool.

At the lower end of the guide cylinder 5, there are provided openings 39 for letting air out of the guide cylinder 5 upon movement of the piston 8 toward the guide cylinder bottom 7. At the lower end of the guide cylinder 5, there is also provided damping means 40 for damping the movement of the piston 8. As soon as the piston 8 passes the opening 39, the waste gases are expelled from the guide cylinder 5 through the openings 39.

Two radial, spaced from each other, through-openings 41, 41 are provided in the cylindrical wall 2 of the combustion chamber 1. Two conduits (not shown), which extend from outside into the through-openings 41, 42, communicate the combustion chamber 1 with a metering valve (likewise not shown) and provide for injection of, e.g., liquefied fuel gas into respective combustion chamber sections which are formed when the movable wall 14 and the separation wall 18 are displace to the operational end positions determined by the stop shackle 32, as also will be described in more detail further below.

A braking device 43 is connected with the tool, as shown in FIG. 1. The braking device 43 is located in the region of the piston rod 10 extending between the guide cylinder 5 and the tool mouth (not shown).

As shown in FIG. 1, a cylindrical tube 44 is inserted in the opening 11 formed in the bottom of the guide cylinder 5. The cylindrical tube 44 has a inner channel 45 extending in the longitudinal direction of the tool. An end portion of the piston and rod 10 extends into the inner channel 45 of the tube 44 which leads to the tool opening or mouth. The cylindrical tube 45 has an axially extending circumferential cut-out 46. The cut-out 46 represents a circumferential groove with a certain axial breadth. The circumferential groove or cut-out 46 occupies a position along the axial or longitudinal extent of the tube 44 such that the free end of the piston rod 10 lies opposite the groove 46 when the piston 8 is located in its rearward position shown in FIG. 1. A circular spring 47 is inserted into the groove 46. The spring 47 is not formed as a complete circle. The circular spring 47 is arranged concentrically with respect to the piston rod 10 and has a conical circumferential inner surface which is so selected that it opens toward the bottom 7 of the guide cylinder 5. In the axial direction, the circular spring 47 is supported in the circumferential groove 46 and can be radially compressed. The cylindrical tube 44 has, in the region of the circumferential cut-out 46, two opposite through-openings 48, 49 in which braking balls 50, 51 are located. The openings 48, 49 are so selected that the balls 50, 51 are biased into the inner channel 45 of the tube 44 by the circular spring 47, extending partially thereinto. The displacement of the balls 50, 51 in the inner channel 45 in the axial direction is limited by upper and lower radial surfaces of the cut-out 46. The through-openings 48, 49 are formed as longitudinal slots extending along the axial length of the cut-out 46, i.e., along the axial extend of the inner channel 45. When the piston rod 10 moves downwardly in FIG. 1 or through the plane of the drawings (in FIG. 2), it entrains the balls 50, 51, pushing them into the cone formed by the inner surface of the spring 47, which results in application of a braking force to the piston rod 10 after a very short displacement of the piston 8. The pressure in the combustion chamber 1 can continue to be built-up, reaching a value that overcomes the braking force applied to the piston, so that the piston 8, together with the piston rod 10, can move further until it reaches its operational end position.

The braking force applied by the braking balls 50, 51 is determined by the biasing force of the circular spring 47. In order to be able to vary the biasing force of the spring 47, there is provided an adjusting element 52. For varying the braking force applied by the braking device 43, the adjusting element 52 compresses or releases the circular spring 47.

The adjusting element 52 is formed as a leg spring having two legs 53, 54 connected by a base 55. The spring leg 52 is quasi u-shaped, with the circular spring 47 being received between the legs 53, 54. The distance between the legs 53, 54 is so selected that it is smaller than the diameter of the circular spring 47 which, as a result, expands the legs 53, 53 upon being inserted therebetween. With the movement of the base 55 in a direction toward the spring 47 or the tube 44, the leg spring 52 will expand, compressing the spring 47, and the spring 47 applies a greater biasing them to the piston rod 10. With the movement of the base 55 in a direction away from the spring 47, the opposite occurs. The displacement of the base 55 is effected with a screw 56 that is screwed in a projection 59 formed on the bottom 7 of the guide cylinder 5. The screw 56 extends through an opening 60 formed in the base 55 and is provided with a head 61 that abuts the outer side of the base 55. Between the inner side of the base 55 and the projection 59, there is provided a compression spring 62 that surrounds the screw 56 being supported thereon. The spring 62 biases the base 55 away from the projection 59. The screw 56 is fixedly connected with a hand wheel 58 with which the screw 56 is screwed in or out of the projection 59 for varying the braking force applied by the braking device 43.

It is important that after the ignition of the fuel gas in the combustion chamber 1, the piston remains in its rearward position for a time sufficient for build-up of an adequately high pressure in the combustion chamber 1 for driving the piston 8 with an adequate power. The braking device 43, by applying a predetermined braking or retaining force to the piston 8, prevents a premature displacement of the piston 8 at the beginning of the pressure built-up. This results in maximizing of the power applied to the piston. A very small displacement of the piston 8 at the beginning of the pressure build-up can be disregarded.

Figure 2:
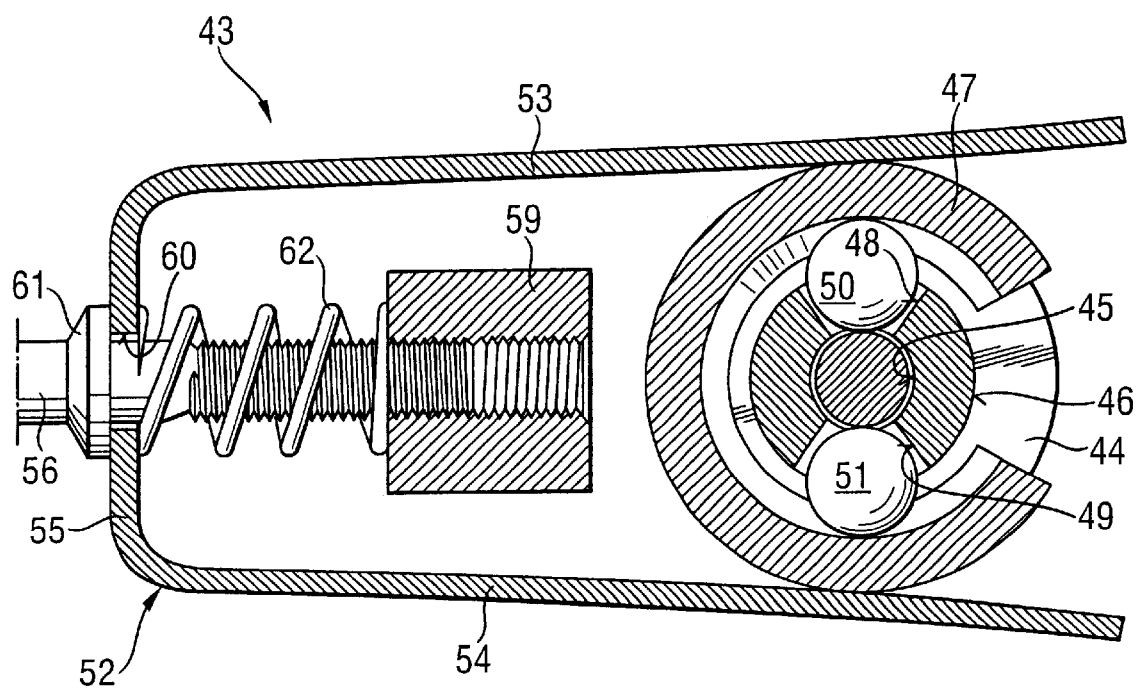
FIG. 2. A cross sectional view along line 11—11 in FIG. 1.

Below the operation of the setting tool shown in FIGS. 1–2 will be described in detail.

FIG. 1 shows the condition of the combustion chamber 1 in the off position of the setting tool. The combustion chamber 1 is completely collapsed, with the separation plate 18 lying on the bottom 3 of the combustion chamber 1 and the movable wall 14 lying on the separation plate 18. The piston 8 is in its rearward off-position, which determined by the stop 13, so that practically no space remains between the piston 8 and the separation plate 18 if one would disregard a small clearance therebetween. The position, in which the movable wall 14 lies on the separation plate 19, results from the compressing spring 30 biasing the drive ring 28 away from the bottom 3, with the ring 28 pulling the movable wall 14 via the drive rods 23. In this position, the drive ring 28 is still spaced from the aeration/deaeration valve, which remains open.

When in this condition, the setting tool is pressed with its front point against an object, the fastening element should be driven in, a mechanism shown only schematically by an element 57, applies pressure to the drive ring 28 displacing it in the direction of the bottom 3 of the combustion chamber 1. This takes place simultaneously with the setting tool being pressed against the object. At that, the movable wall 14 is lifted off the separation plate 19 and entrains therewith, via the compression spring 18c and the flange 18, the separation plate 18. Upon displacement of the separation wall 18, a so-called main chamber section, which is formed between the separation plate 18 and the bottom 3, expands. During the expansion of the main chamber section, air is aspirated thereinto via still open aeration/deaeration valve 31.

Upon further pressing of the tool against the object, the drive ring 28 is displaced further in a direction toward the bottom 3, and, in a while, the projection 18a engages the shackle 32. If the drive ring 28 is displaced further toward the bottom 3, the movable wall 14 separates from the separation plate 18, whereby a so-called forechamber section is formed between the movable wall 14 and the separation plate 18. Air into the forechamber section is aspirated through the aeration/deaeration valve 31 and the through-openings 38 formed in the separation plate 18.

As soon as the movable wall 14 and the separation plate 18 pass, in their movement upward, the respective radial openings 41, 42, in principle, an injection of a metered amount of the liquefied fuel gas into the forechamber and main chamber sections can start. At the end of the displacement of the movable wall 14, the aeration/deaeration valve 31 closed by the drive ring 28.

In the completely expanded position of the forechamber and main chamber sections, the movable wall 14 and the separation plate 18 become locked in their positions. This is effected by actuation of an appropriate lever or a trigger of the tool. The locking can take place shortly after the actuation of the trigger or shortly after ignition of the fuel gas mixture in the combustion chamber 1 of the setting tool. Upon actuation of the ignition device 20, an electrical spark ignites a preliminary formed mixture of the air and the fuel gas in the forechamber section of the combustion chamber 1. Upon ignition of the mixture, a flame front starts to propagate radially with a relatively small velocity. The flame front pushes the unconsumed air fuel gas mixture penetrates through the through-openings 38 in the separation plate 18 into the main combustion chamber section, creating there turbulence and pre-compression.

As the flame front reaches the through-openings 38, the flame penetrates there-through, due to a small cross-section of the openings 38, in a form of flame jets into the main chamber section, creating there a further turbulence.

The thoroughly intermixed air-fuel gas mixture in the main chamber section ignites over the entire surface of the flame jets, which results in the pressure built-up in the main chamber section.

The pressure, which is built-up in the main chamber section, impacts the piston 8 which can be displaced only a short distance after the start of its displacement, as a braking force is applied thereto upon displacement of the braking balls 50, 51 into the cone formed in the circular spring 47. Further displacement of the piston 8 is prevented by the braking device 43 which is adjusted to a predetermined braking force. The piston 8 practically remains in its initial position until a sufficient pressure is built-up in the main chamber section. When a sufficient pressure has been built up, it overcomes the braking force of the braking device 43, and the piston 8 is displaced with a high speed in a direction toward the bottom 7 of the guide cylinder 5, forcing the air from the guide cylinder 5 out through the openings 39. Upon the piston plate 9 passing the openings 39, the exhaust gas in discharged therethrough. The piston rod 10 effects setting of a fastening element.

After setting or following the combustion of the air-fuel gas mixture, the piston 8 is brought to its initial position, which is shown in FIG. 1, as a result of thermal feedback produced by cooling of the flue gases which remain in the combustion chamber 1 and the guide cylinder 5. As a result of cooling of the flue gases, an underpressure is created behind the piston 8 which provides for return of the piston 8 to its initial position. The combustion chamber 1 should remain sealed until the piston 8 reaches its initial position. This means that the aeration/deaeration valve 31 also should remain closed.

The braking device 43 should not apply a braking force to the piston 8 when the piston 8 return to its initial position. This is achieved due to the selected direction of the conicity of the cone formed by the circular spring 47, as the braking balls 50, 51, being entrained-by the piston rod 10, encounter no resistance, so that no braking force is applied to the piston rod 10.

After it is insured that the piston 8 reached its initial position, which is shown in FIG. 1, again, the movable wall 14 and/or the drive ring 28, and/or the aeration/deaeration valve 31 is (are) unlocked. The compression springs 30 bias the drive ring 28 in a direction away from the bottom 3 of the combustion chamber 1, whereby the aeration/deaeration valve 31 completely opens. Upon movement of the drive ring 28 away from the bottom 3, the drive rods 23 pull the movable wall 14 in a direction toward the bottom 3. Upon the movement of the movable wall 14 in the direction toward the bottom 3, the compression spring 18c biases, via the flange 18b of the projection 18a of the separation plate 18, the separation plate 18 toward the movable wall 14. Thus, first, the forechamber section is deaerated, with the flue gases exiting through the aeration/deaeration valve 31. After the movable wall 14 abuts the separation plate 18, both move in the direction toward the bottom 3, with now the main chamber section being deaerated through the aeration/deaeration valve 31. In a while, the separation plate 18 abuts the bottom 3, with the movable wall 14 lying on the separation plate 18. The combustion chamber 1 becomes completely collapsed and free of flue gases. Now, an aeration process can begin anew upon the next setting of a fastening element.

The structure and operation of the tool was discussed above with reference to an embodiment with a collapsible combustion chamber. However, it should be clear that the present invention can be used with a setting tool or another tool in which the combustion chamber wall and/or separation plate are not displaced in the axial direction of the combustion chamber. In effect the present invention can be used with any tool the combustion chamber of which consists of a single chamber section and is not divided into forechamber and main chamber sections.

Although the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A portable, combustion-engined tool, comprising a combustion chamber (1); a piston (8) adjoining the combustion chamber (1), a pressure build-up in the combustion chamber (1) providing for movement of the piston (8) from an initial position thereof, in which the piston adjoins the combustion chamber (1), away from the combustion chamber (1); brake means (43) for retaining the piston (8) substantially in the initial position thereof during build-up of pressure in the combustion chamber (1) until the pressure reaches a predetermined value; and manually adjustable means for changing a braking force applied by the braking means (43) to the piston (8).

2. A tool according to claim 1, wherein the braking means (43) is arranged in a region of a piston rod (10) connected with the piston (8).

3. A tool according to claim 2, wherein the braking means (43) comprises at least one braking member (50, 51) which is biased against the piston rod (10).

4. A tool according to claim 3, wherein the braking means (43) comprises a compression spring (47) for biasing the at least one braking member (50, 51) against the piston rod (10).

5. A tool according to claim 4, wherein the compression spring (47) is formed as a circular spring surrounding the piston rod (10).

6. A tool according to claim 4, wherein the braking means (43) further comprises an actuation member (52) having an adjustable actuation force for acting on the spring (47).

7. A tool according to claim 3, wherein the at least one braking member (50, 51) is formed as a roll member.

8. A portable, combustion-engined tool, comprising a combustion chamber (1); a piston (8) adjoining the combustion chamber (1), a pressure build-up in the combustion chamber (1) providing for movement of the piston (8) from an initial position thereof, in which the piston adjoins the combustion chamber (1), away from the combustion chamber (1); brake means (43) for retaining the piston (8) substantially in the initial position thereof during build-up of pressure in the combustion chamber (1); and means for changing a braking force applied by the braking means (43) to the piston (8), wherein the braking means (43) is arranged in a region of a piston rod (10) connected with the piston (8), wherein the braking means (43) comprises at least one braking member (50, 51) which is biased against the piston rod (10), wherein the braking means (43) comprises a compression spring (47) for biasing the at least one braking member (50, 51) against the piston rod (10), wherein the braking means (43) further comprises an actuation member (52) having an adjustable actuation force for acting on the spring (47), and wherein the actuation member (52) is formed as a spring stirrup having two legs (53, 54) for receiving the spring (47), together with the piston rod (10), there between.

9. A tool according to claim 8, wherein the spring stirrup has a base (55) connecting the two legs (53, 54), and the braking means (43) further comprises means for displacing the base (55) toward and away from the piston rod (10).

* * * * *